United States Patent
Lai et al.

(10) Patent No.: US 9,682,501 B2
(45) Date of Patent: Jun. 20, 2017

(54) MANUFACTURING METHOD OF A SOUND PLAYING ASSEMBLY

(71) Applicant: CONCRAFT HOLDING CO., LTD., Grand Cayman (KY)

(72) Inventors: Shih-Chia Lai, Grand Cayman (KY); Chin-Hsing Lee, Grand Cayman (KY); Tong Su, Grand Cayman (KY); Jie Wu, Grand Cayman (KY)

(73) Assignee: CONCRAFT HOLDING CO., LTD., Grand Cayman (KY)

( * ) Notice: Subject to any disclaimer, the term of this patent is extended or adjusted under 35 U.S.C. 154(b) by 292 days.

(21) Appl. No.: 14/719,941

(22) Filed: May 22, 2015

(65) Prior Publication Data
US 2016/0176086 A1 Jun. 23, 2016

(30) Foreign Application Priority Data
Dec. 19, 2014 (TW) .............................. 103144407 A

(51) Int. Cl.
*B29C 45/14* (2006.01)
*H04R 31/00* (2006.01)
*B29L 31/38* (2006.01)

(52) U.S. Cl.
CPC .. *B29C 45/14221* (2013.01); *B29C 45/14008* (2013.01); *B29C 45/14336* (2013.01); *H04R 31/006* (2013.01); *B29L 2031/38* (2013.01); *H04R 2400/11* (2013.01); *H04R 2499/11* (2013.01)

(58) Field of Classification Search
CPC ........ B29C 45/14221; B29C 45/14008; B29C 2793/0081; B29L 2031/38; B29B 11/02; H04R 2499/13; H04R 2400/11

USPC .......................................................... 264/152
See application file for complete search history.

(56) References Cited

U.S. PATENT DOCUMENTS 3,941,638 A * 3/1976 Horky ...................... H04R 1/02
156/196
6,533,980 B1 * 3/2003 van Manen .......... B26D 7/1818
156/256

FOREIGN PATENT DOCUMENTS

KR 20120020007 A * 3/2012
TW M469706 U 1/2014

* cited by examiner

*Primary Examiner* — Alison L Hindenlang
*Assistant Examiner* — Mohamed K Ahmed Ali
(74) *Attorney, Agent, or Firm* — Rabin & Berdo, P.C.

(57) ABSTRACT

The instant disclosure relates to a manufacturing method of a sound playing assembly for micro-sized speaker. The method includes the following steps: providing a carrier having a strip-shaped grill member; cutting the carrier after it has been transferred into a cutting unit to obtain a trimmed grill member; transferring the trimmed grill member onto a machine plate; and performing injection molding with molten plastic after the trimmed grill member is transferred from the machine plate into a mold by a material handling equipment, in order to form a seat body having a speaker basket surrounding the trimmed grill member, with the speaker basket partially embedded in the grid structure of the trimmed grill member.

The trimmed grill member and the seat body are thus formed integrally in providing a sound playing assembly. The assembly can help to improve production yield rate and be mass-produced in an automated process.

15 Claims, 9 Drawing Sheets

MANUFACTURING METHOD OF A SOUND PLAYING ASSEMBLY

CROSS-REFERENCES TO RELATED APPLICATIONS

This non-provisional application claims priority under 35 U.S.C. §119(a) on Patent Application No. 103144407 filed in Taiwan, R.O.C. on Dec. 19, 2014, the entire contents of which are hereby incorporated by reference.

BACKGROUND

Technical Field

The instant disclosure relates to a sound playing assembly for a micro-sized speaker, in particular, to a sound playing assembly integrally formed of a grill member and a seat body having a speaker basket by injection molding.

Related Art

Micro-sized speakers are essential components in allowing mobile phones or tablet computers to play and amplify sound. The sound quality is thus dependent on the performance of these speakers.

As mobiles phones and tablet computers continue to become thinner, micro-sized speakers are also becoming smaller in size. Known micro-sized speakers are typically built of a grill member placed on a speaker basket. The securement of the grill member is normally achieved by adhering it to the front edge portion of the speaker basket. However, with the adhesive approach, the grill member is susceptible to falling off of the speaker basket due to disruptive forces or loose adhesion, affecting sound quality adversely.

As shown in FIGS. 1 and 2 of the drawings, to resolve the previously mentioned issue, current practices typically employ a cap B to secure a grill member C on the upper edge portion of a speaker basket A. When disposing cap B on the speaker basket A, high-frequency welding technique is utilized to join both elements. Thus, the grill member C can be secured permanently on the speaker basket A.

However, for the approach described previously, a certain amount of space must be left between the cap B and the speaker basket A, in order for adhesion and fixation to take place. This limitation is unable to satisfy the requirements associated with the minimization of micro-sized speakers.

Please refer to Taiwan Patent No. M469706, entitled "Improvement of the Micro Speaker Structure". This utility model patent is granted to the inventor of this application, and the patent discloses a seat body having a speaker basket is formed integrally with a grill member by injection molding. The approach allows the front end portion of the speaker basket to partially embed into the grill member. Thus, the grill member is prevented from falling off. In addition, the speaker basket is made shorter in height, which also meets the requirements of miniaturizing the speakers.

The inventor is involved with the advancement of the speaker-related products. To improve the manufacturing yield rate, manufacturing automation, and fulfilling the requirements of mass production, the inventor has been actively participating in research and innovation to complete the instant disclosure.

SUMMARY

In view of the previous comments, the instant disclosure provides a manufacturing method of a sound playing assembly. The method particularly relates to a trimmed grill member integrally formed with a seat body having a speaker basket by injection molding. Such a method is capable of improving manufacturing yield rate, and applicable with automated mass production.

The manufacturing method of the instant disclosure is principally applied to micro speakers. The method comprises the following steps: providing a carrier carrying a strip-shaped grill member; cutting the carrier after it is transferred to a cutting unit to obtain a trimmed grill member; transferring the trimmed grill member onto a machine plate; performing injection molding with molten plastic inside a mold cavity after the trimmed grill member is moved from the machine plate into the mold by a material handling equipment, in order for a seat body having a speaker basket to be formed extendingly from the trimmed grill member, such that the speaker basket is partially embedded into the grid structure of the trimmed grill member.

Consequently, the trimmed grill member and the seat body are formed integrally in providing a sound playing assembly. Through this assembly, manufacturing yield rate can be increased and automated mass production can be achieved.

During the cutting operation of the strip-shaped grill member, the cutting tool will sever the grill member and cut into a portion of a soft base plate. However, the soft base plate will not be severed, in order to separate the trimmed grill member from the soft base plate. The separation allows the trimmed grill member to be embedded into the cutting tool.

The cutting tool defines a cutting edge formed with a receiving groove. The receiving groove is shaped to the desired finished contour of the trimmed grill member, in order for the trimmed grill member to be embedded in the receiving groove of the cutting tool.

Additionally, the machine plate is topped with a subplate, and a buffer member is arranged underneath the subplate. As the cutting tool unloads the trimmed grill member onto the subplate, the buffer member protects the cutting tool by reducing direct metal-to-metal impact to prevent the cutting tool from being damaged.

The subplate overlooks the machine plate, and the buffer member is formed of at least one buffering material. The buffering material is selected from an elastic material or a plastic material. Alternatively, the buffer member may include a platform and a flexible element. The subplate is arranged above the platform, and the flexible member is disposed underneath the platform. This alternative configuration also provides a buffering effect.

The material-handling machine may be a robotic arm, in order to transfer the trimmed grill member from the subplate into the mold.

The cutting unit, the machine plate, the material-handling machine, and the mold are each equipped with a material-pickup apparatus. These material-pickup apparatuses allow the trimmed grill member to be secured effectively internal of the cutting unit, and facilitate the transfer of the trimmed grill member between the cutting unit, the machine plate, the material handling machine, and the mold.

Another aspect of the instant disclosure is that the cutting tool and the carrier jointly define and angle therebetween. The angle can be adjusted according to the design of the grid structure of the grill member. A preferred angle is approximately 45 degrees.

DETAILED DESCRIPTION

Figure 1:
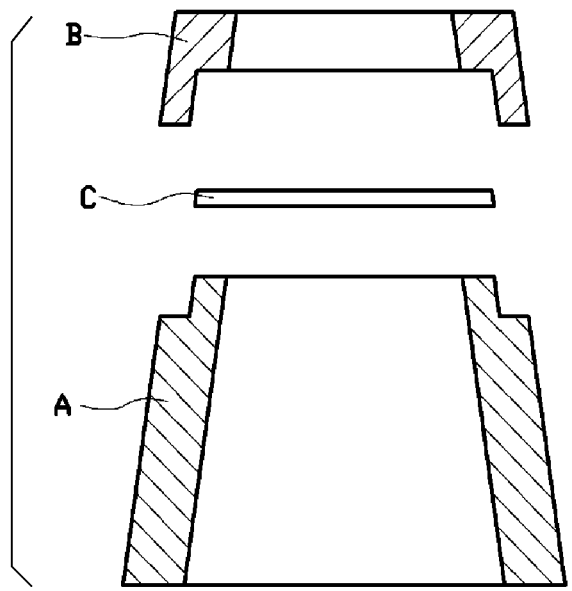
FIG. 1 is a cross-sectional view of assembling a known sound playing assembly.
Figure 2:
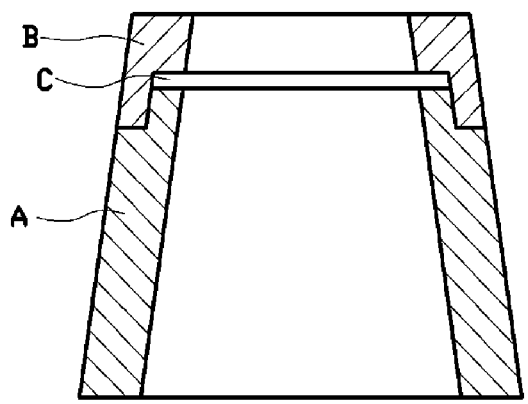
FIG. 2 is a cross-sectional view of the assembly in FIG. 1.
Figure 3:
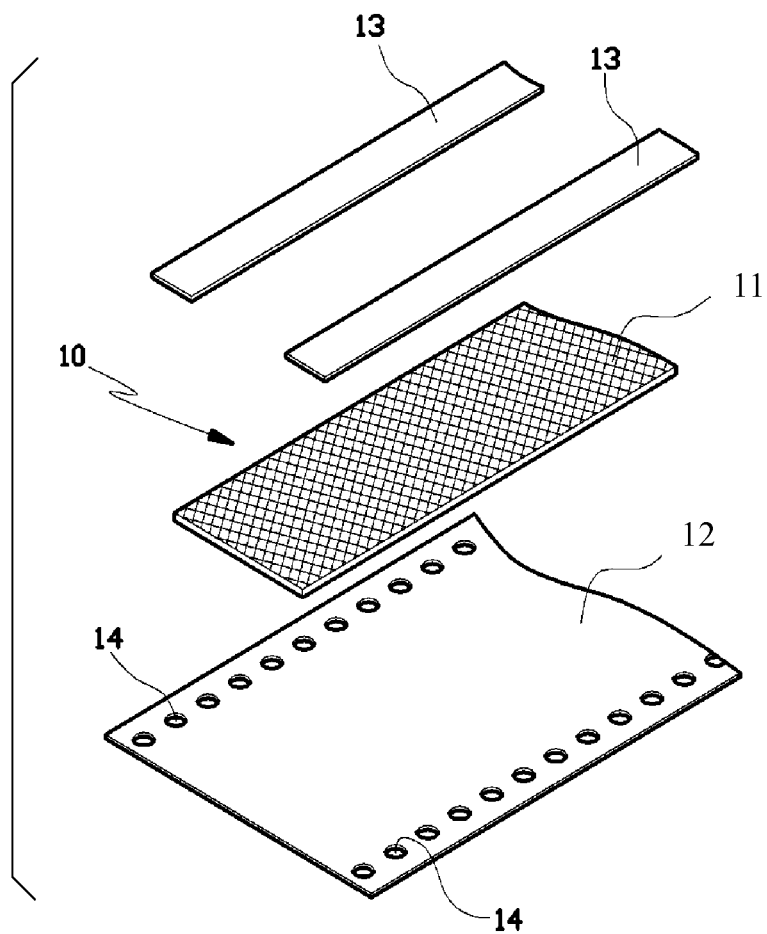
FIG. 3 is an exploded view of a carrier of the instant disclosure.
Figure 4:
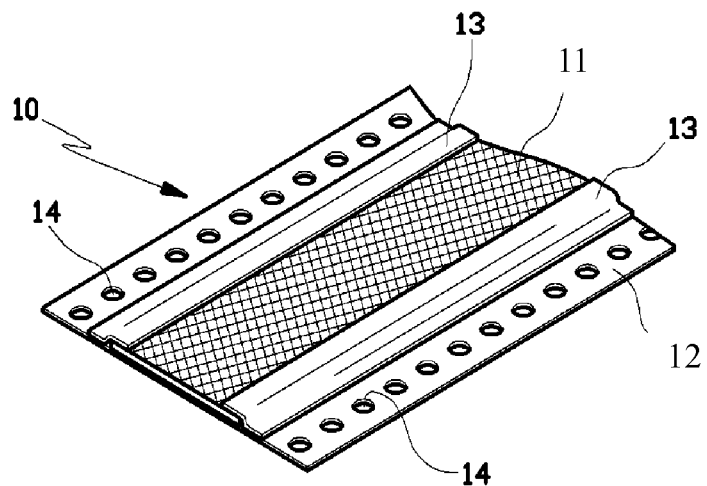
FIG. 4 is a perspective view of the carrier in FIG. 3.
Figure 5:
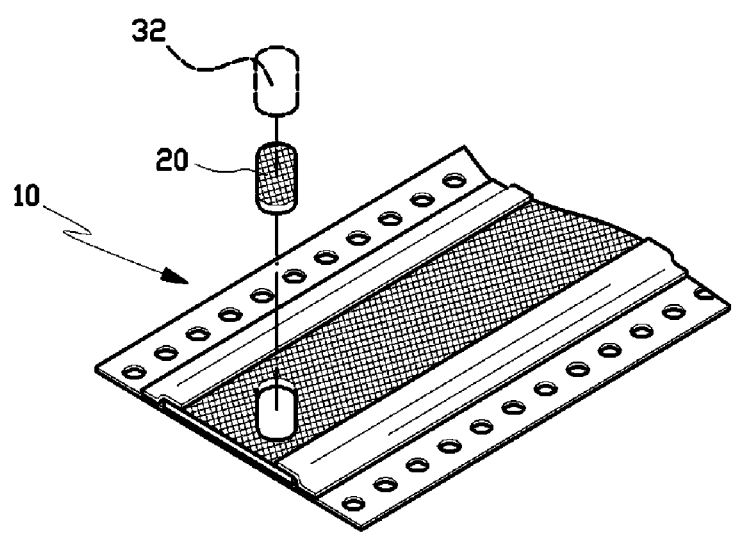
FIG. 5 is a schematic view showing a grill member being cut out from the carrier of the instant disclosure.
Figure 6A:
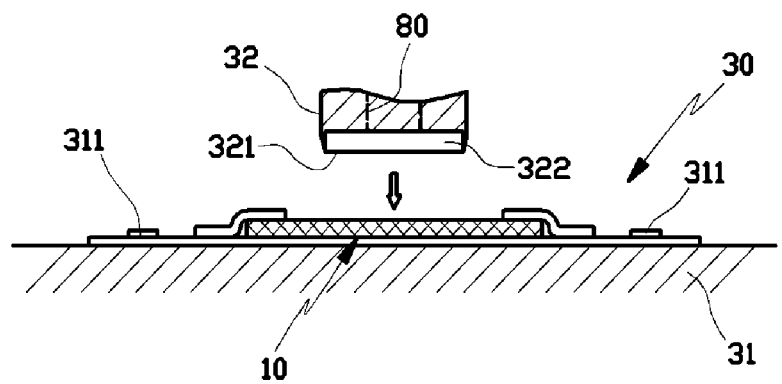
FIGS. 6A~6C are schematic views showing the cutting step of the instant disclosure.
Figure 6B:
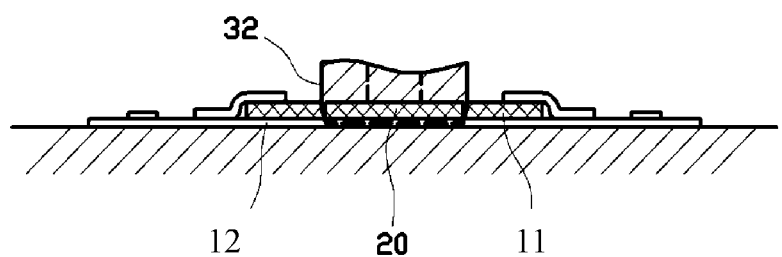
Figure 6C:
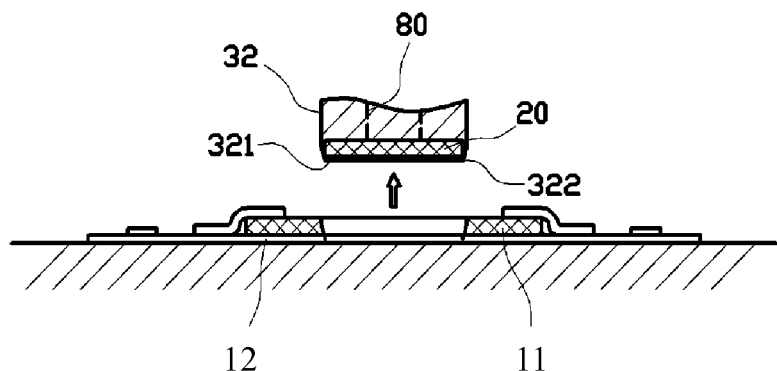

Please refer to FIGS. 3 and 4, in which a manufacturing method of a sound playing assembly of the instant disclosure comprises the step of providing a strip-shaped carrier 10. The carrier 10 includes, likewise, a strip-shaped grill member 11. The strip-shaped grill member 11 is disposed on a soft base plate 12. An adhesive agent 13 is applied to opposite long sides of the strip-shaped grill member 11, in making the strip-shaped grill member 11 adhering to the soft base plate 12. For the present embodiment, the strip-shaped grill member 11 is secured to the central portion of the soft base plate 12. In addition, a plurality of securing holes 14 is formed on opposite sides of the soft base plate 12 in a manner adjacent to the long sides of the strip-shaped grill member 11. The securing holes 14 formed on each of two opposite sides of the soft base plate 12 are aligned in order along the extending direction of the carrier 10.

In conjunction with FIGS. 5~10, the remaining steps of the manufacturing method of the sound playing assembly of the instant disclosure are described hereinbelow.

Please refer to FIGS. 5 and 6A~6C, which illustrate the cutting step of the manufacturing method. The cutting step mainly involves cutting out a trimmed grill member 20 from the carrier 10. The first action is to pull the carrier 10 onto a cutting unit 30. The cutting unit 30 includes a machine table 31 and a cutting tool 32. The cutting tool 32 is reciprocatable along a perpendicular direction to the machine table 31. The machine table 31 further includes a plurality of locating keys 311 for mating with the securing holes 14 of the carrier 10. Thus, the carrier 10 can be fixed onto the machine table 31. The cutting tool 32 has a cutting edge 321 formed toward the machine table 31. The cutting edge 321 is pre-shaped and has a receiving groove 322 formed concavedly on the central region thereof.

Consequently, when the carrier 10 is pulled onto the machine table 31, the cutting tool 32 is operated reciprocatingly in a manner perpendicular to the machine table 31. The reciprocating motion allows the cutting edge 321 to cut the strip-shaped grill member 11. Once the strip-shaped grill member 11 is thoroughly cut through, the cutting tool 32 will continue its downward motion until the soft base plate 12 is reached. The cutting tool 32 will then be pulled upward in returning to its home position. During the cutting process, the soft base plate 12 will not be completely severed like the strip-shaped grill member 11. Since the cutting edge 321 has a pre-determined shape, a trimmed grill member 20 having a particular shape is cut out by the cutting edge 321 from the strip-shaped grill member 11. The trimmed grill member 20 is then received embeddingly by the receiving groove 322 to complete the cutting process.

In addition, the cutting tool 32 and the carrier 10 can mutually define a cutting angle. For the present embodiment, a cutting angle of approximately 45 degrees is formed therebetween. The cutting angle may be adjusted in accordance to the grid design of the strip-shaped grill member 11.

Figure 7A:
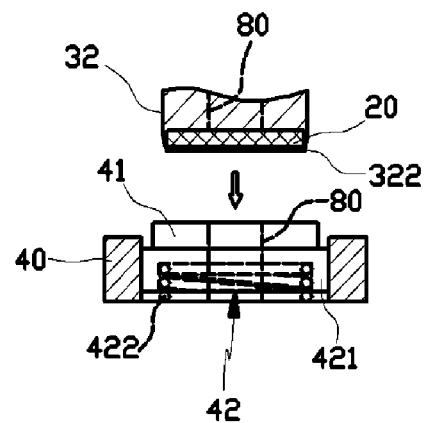
FIGS. 7A~7C are schematic views showing the transferring step of the instant disclosure.
Figure 7B:
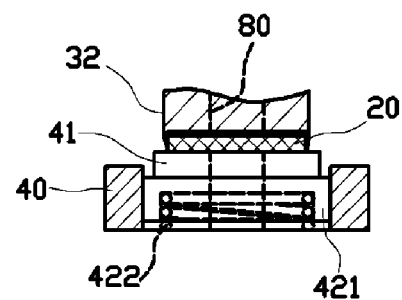
Figure 7C:
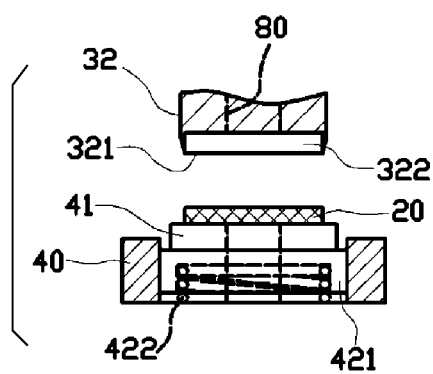
Figure 8A:
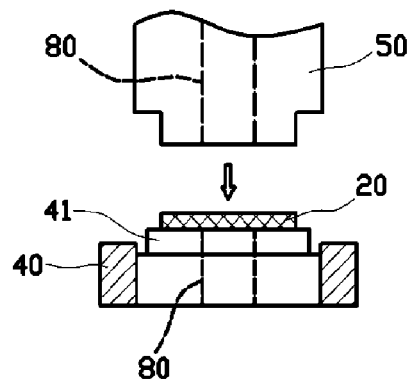
FIGS. 8A~9D are schematic views showing the injection molding step of the instant disclosure.
Figure 8B:
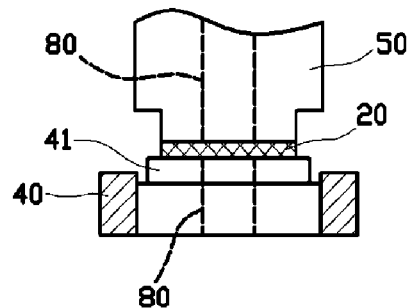
Figure 8C:
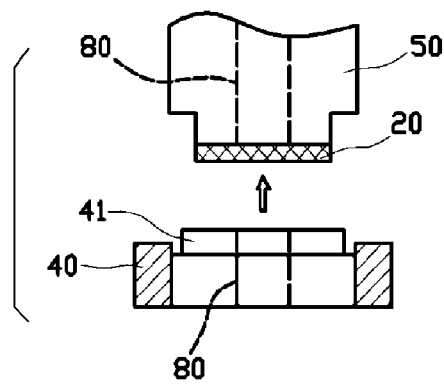
Figure 9A:
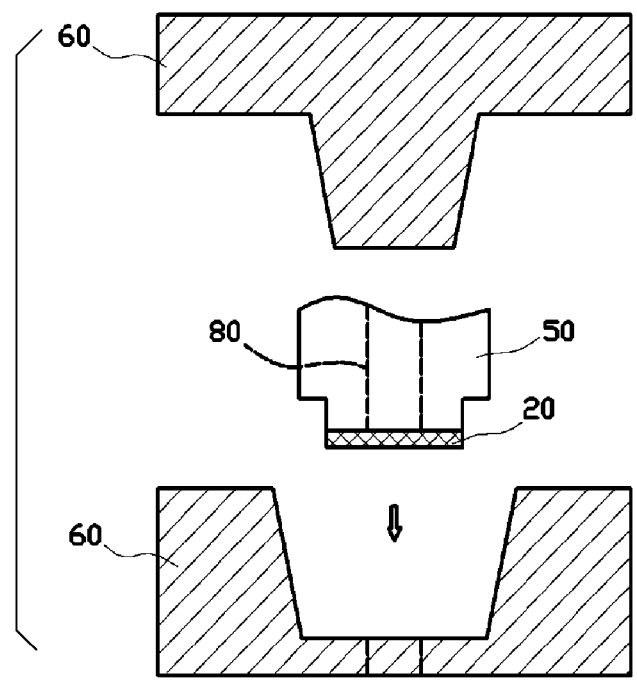
Figure 9B:
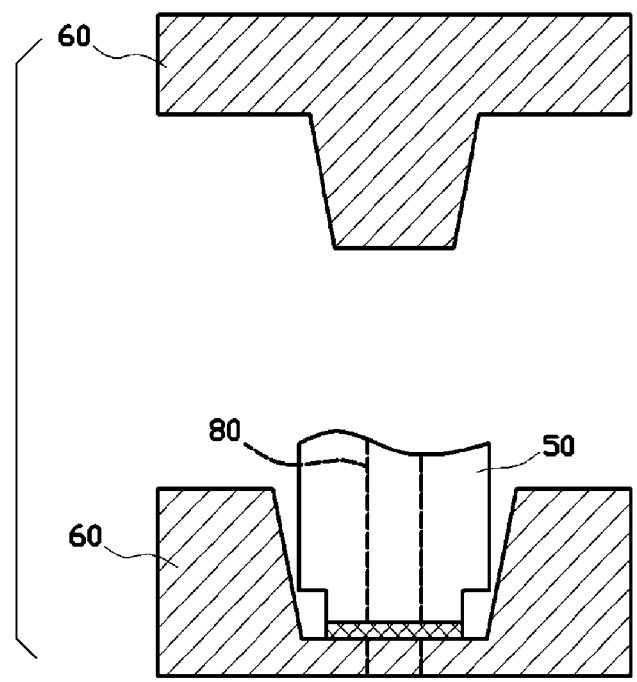
Figure 9C:
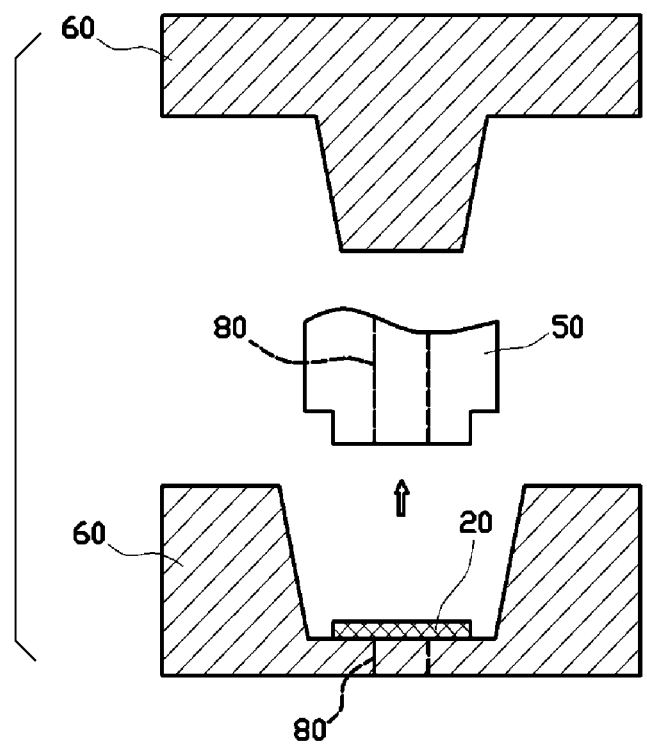
Figure 9D:
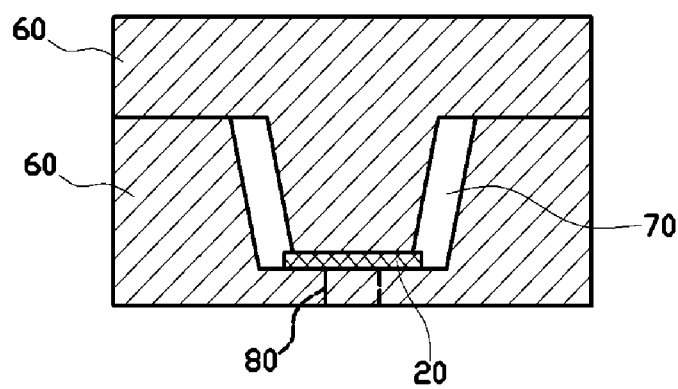

After the cutting step has been completed, the next step involves a transferring process, as illustrated in FIGS. 7A~7C. The transferring step principally involves transferring the trimmed grill member 20 onto a machine plate 40. It should be noted that the receival of the trimmed grill member 20 by the receiving groove 322 of the cutting tool 32 is to facilitate the transferring process (to be described later), of the trimmed grill member 20 to a mold for injection molding.

Consequently, the transfer of the trimmed grill member 20 from the cutting tool 32 to the machine plate 40 is carried out as follows. The cutting tool 32 is first moved to be above the machine plate 40. The machine plate 40 is topped with a subplate 41, which overlooks the machine plate 40. The cutting tool 32 is then moved toward the subplate 41, in order for the cutting edge 321 to be flushed with the subplate 41. Next, the trimmed grill member 20 is pushed out from the receiving groove 322 of the cutting tool 32, such that the trimmed grill member 20 falls onto the subplate 41. The cutting tool 32 is then moved upward in returning to its home position to complete the transferring step.

However, to maximize the service life of the cutting edge 321 of the cutting tool 32, a buffer member 42 is disposed below the subplate 41. The buffer member 42 can be made of at least one buffering material, and the buffering material can be a flexible material or a plastic material. The buffer member 42 enables the subplate 41 to provide a buffering effect, when the cutting edge 321 is in abutment with the subplate 41. The buffer member 42 effectively reduces the impact applied to the cutting edge 321 by the rigid subplate 41, thus extending the service life of the cutting edge 321.

For the present embodiment, the buffer member 42 includes a support table 421 and an elastic element 422. The subplate 41 is disposed above the support table 421, and the elastic element 422 is arranged below the support table 421. When the cutting edge 321 of the cutting tool 32 is in abutment with the subplate 41, the elastic element 422 enables the support table 421 to provide a buffering effect, so as to reduce the impact applied to the cutting edge 321 to prolong its service life.

Figure 10:
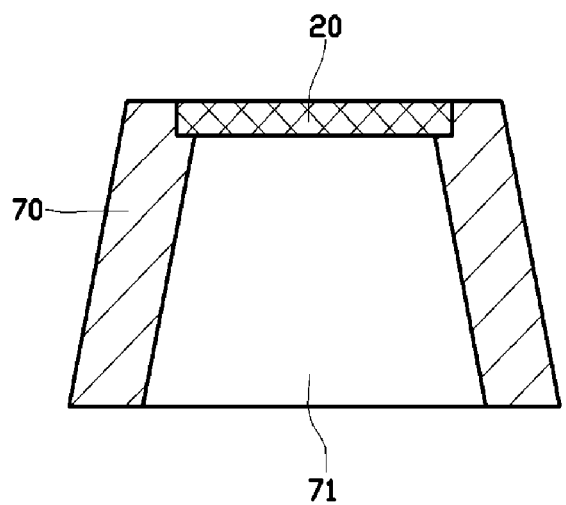
FIG. 10 is a schematic view of a sound playing assembly of the instant disclosure.

The transferring step is followed by the injection molding step, as shown in FIGS. 8A~9D. In this step, a material handling machine is utilized to transfer the trimmed grill member 20 from the subplate 41 to the inside of a mold 60. Inside the mold 60, plastic material is employed in order to form a seat body 70 having a speaker basket 71 around the trimmed grill member 20 by injection molding. As shown in FIG. 10, the trimmed grill member 20 and the seat body 70 are formed integrally.

More specifically, after the trimmed grill member 20 is disposed on the subplate 41 of the machine plate 40, a material handling machine 50 is employed to move the trimmed grill member 20 to the inside of the mold 60. For the present embodiment, the material handling machine 50 is a robotic arm. The material handling machine 50 is first moved to be above the subplate 41. The material handling machine 50 is then moved toward the subplate 41, and the trimmed grill member 20 is moved onto the material handling machine 50. Next, the material handling machine 50 is moved into the mold 60, such that the trimmed grill member 20 is inside of the mold 60. The material handling machine 50 is then moved out of the mold 60, and the mold 60 is closed to perform injection molding with molten plastic. Under injection molding, the trimmed grill member 20 is surrounded by the molten plastic. Once the plastic has cooled and solidified, the seat body 70 having the speaker basket 71 is formed. It should further be noted that the seat body 70 is formed integrally with the trimmed grill member 20. Therefore, the trimmed grill member 20 is effectively secured to the speaker basket 71 of the seat body 70 in forming a sound playing assembly, as shown in FIG. 10.

Please refer back to FIGS. 6A~9D, in which to allow effective securement of the trimmed grill member 20 in the receiving groove 322 of the cutting tool 32, and to facilitate the transfer of the trimmed grill member 20 between the cutting tool 32, the machine plate 40, the material handling machine 50, and the mold 60, the cutting tool 32, the machine plate 40, the material handling machine 50, and the mold 60 is each equipped with a material pick-up apparatus 80. The material pick-up apparatus 80 may be a suction cup or a magnetic element. The operation of the suction cup is vacuum-based to suck the trimmed grill member 20. Additionally, with regard to the magnetic element, magnetism is induced by the flow of electricity to attract the trimmed grill member 20. The presence of the material pick-up apparatus 80 allows the trimmed grill member 20 to be effectively secured by the receiving groove 321 of the cutting tool 32, and the transfer of the trimmed grill member 20 between the cutting tool 32, the machine plate 40, the material handling machine 50, and the mold 60.

While the instant disclosure has been described by way of example and in terms of the preferred embodiments, it is to be understood that the invention needs not be limited to the disclosed embodiments. For anyone skilled in the art, various modifications and improvements within the spirit of the instant disclosure are covered under the scope of the instant disclosure. The covered scope of the instant disclosure is based on the appended claims.

What is claimed is:

1. A manufacturing method of a sound playing assembly for a micro-sized speaker, comprising the steps of:
   providing a carrier having a soft base plate and a strip-shaped grill member disposed on the soft base plate, two opposite sides of the strip-shaped grill member being secured to the soft base plate;
   cutting the carrier by a cutting tool after the carrier is transferred into a cutting unit having the cutting tool to obtain a trimmed grill member, the trimmed grill member being embedded in the cutting tool; transferring the trimmed grill member from the cutting tool onto a machine plate by moving the cutting tool to be in abutment with the machine plate; and performing injection molding with molten plastic inside a mold cavity after the trimmed grill member being moved from the machine plate into the mold by a material handling machine, to form a seat body having a speaker basket on the trimmed grill member, wherein the material handling machine is a robotic arm.

2. The method of claim 1, wherein the two opposite sides of the strip-shaped grill member are secured to the soft base plate by at least one adhesive material.

3. The method of claim 1, wherein the cutting tool of the cutting unit has a cutting edge having a receiving groove formed concavedly in the central region thereof, and wherein the trimmed grill member is embedded in the receiving groove.

4. The method of claim 1, wherein the machine plate is topped with a subplate and a buffer unit is disposed below the subplate.

5. The method of claim 4, wherein the subplate overlooks the machine plate.

6. The method of claim 4, wherein the buffer unit is made of at least one buffering material.

7. The method of claim 6, wherein the buffering material is selected from a group consisting of an elastic material and a plastic material.

8. The method of claim 4, wherein the buffer unit includes a support table and an elastic element, and wherein the subplate is arranged above the support table and the elastic element is arranged below the support table.

9. The method of claim 1, wherein the cutting tool, the machine plate, the material handling machine, and the mold each have a material pick-up device for transferring the trimmed grill member therebetween.

10. The method of claim 9, wherein the material pick-up device is selected from a group consisting of a suction cup and a magnetic element.

11. The method of claim 1, wherein the cutting tool, the machine plate, the material handling machine, and the mold each have a material pick-up device for transferring the trimmed grill member therebetween.

12. The method of claim 11, wherein the material pick-up device is selected from a group consisting of a suction cup and a magnetic element.

13. The method of claim 1, wherein the carrier and the cutting tool of the cutting unit mutually define an angle.

14. The method of claim 13, wherein the angle is preferably 45 degrees.

15. The method of claim 1, wherein the cutting tool thoroughly cuts through the strip-shaped grill member but not the carrier.

* * * * *